United States Patent Office 3,295,613
Patented Jan. 3, 1967

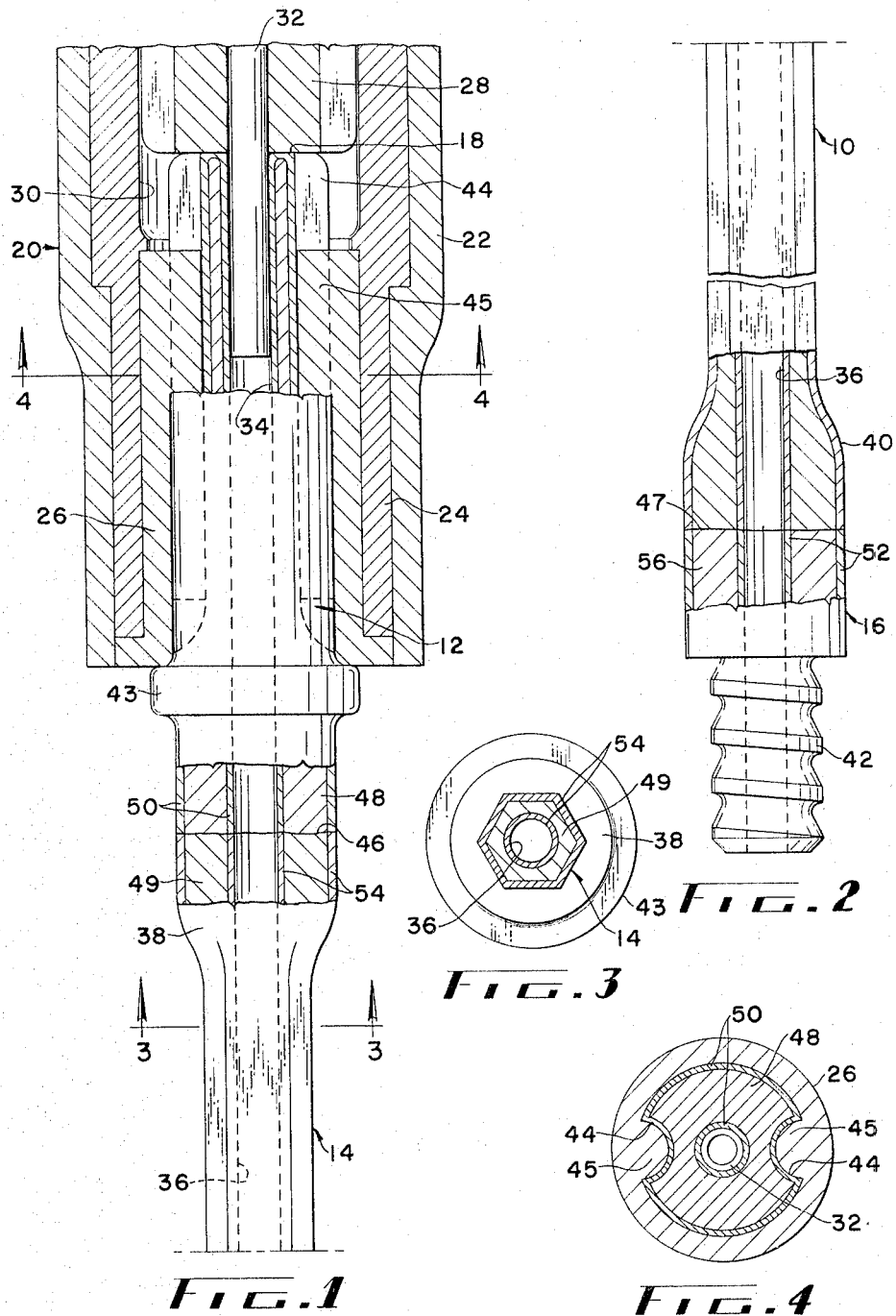

3,295,613
COMPOSITE DRILL ROD AND METHOD
FOR MAKING THE SAME
Floyd R. Anderson, Quincy, Ill., assignor to Gardner-Denver Company, a corporation of Delaware
Filed Aug. 12, 1964, Ser. No. 389,052
5 Claims. (Cl. 173—131)

This invention relates to percussive drill rods and to a method for manufacturing a composite rod whereby certain operations are advantageously performed on individual rod components before joining the same together while other operations are performed on the assembled rod.

Presently, percussive drill rods having enlarged shanks are made by subjecting a single length of hollow bar stock to hot upset forging, machining and heat treating operations. Usually, the shank is formed by upsetting one end of the rod to provide an enlarged striking face and a collar. Thereafter, the shank is subjected to machining operations whereby the center bore is cleared of upset material and the striking face is squared and flattened. The bit end of the rod may have cutting means integrally formed or brazed thereon or may be machined to provide either a taper or thread which matingly engages with a detachable bit. Finally, the rod is hardened by suitable heat treatment and is straightened.

Those skilled in the arts of making and using percussive drilling equipment are familiar with certain long standing problems associated with the use of equipment of this type wherein the drill rod is subjected to rapidly fluctuating forces of a high order created by the repeated impacting of the drill hammer mass against the blow-receiving surface of the shank. In the past, the service life of drill rods has been seriously limited due to chipping and deformation at the blow-receiving shank surface and due to cracking or breaking at various points along the length of shank. Destructive wearing and spalling often occur along the sides of the shank due to extremely high sliding pressures created by reciprocal movement of the shank within the rotating chuck under conditions of substantial misalignment. Such misalignment also contributes to excessive wear and damage to the hole flushing tube extending into the shank bore and to cocking of the blow-receiving shank surface relative to the striking face of the hammer piston thereby lowering the efficiency with which energy is transmitted from the drill through the rod to the cutting bit.

Still another well-known cause of early failure of the shank portion of a drill rod is directly attributable to certain inherent inefficiences in conventional hot upset forging operations which entail gathering a substantial quantity of rod stock to provide an enlarged shank body and the usual integral collar intermediate the ends of shank body. Where such forging is employed to effect substantial enlargement of the shank cross section over that of the rod body, forging defects such as internal folds and laps, particularly those opening to the shank center bore, produce transverse cracks leading to early and complete failure of the shank. Excessive scaling of internal and external shank surfaces constitutes another troublesome aspect of conventional hot forging methods employed to fabricate shank ends of drill rods. Moreover, the maximum degree of enlargement of the shank cross section by upset forging is defined in practice by physical limitations peculiar to this metal working art and by the high costs of equipment and labor required for the several heating and forging steps needed to produce drastic deformations involved in forging relatively large shank cross sections on nominally sized rods. These limitations with respect to the maximum size differential between the cross sections of the shank and the rod body have heretofore frustrated operators of rock drilling equipment in their desire to employ percussive drills having hammers with large striking faces to drive rods of relatively smaller cross sections. Stated otherwise, the maximum physical size, therefore the maximum power, of a drill to be employed to drive a rod of a given cross section has heretofore been dictated by the operational limitations of conventional forging methods for enlarging the cross section of the shank end of the rod. To drill operators this anomalous situation presents equally unattractive alternatives, i.e., either a drill of undesirably low capacity mus tbe employed in order to avoid damage to the hammer face as it strikes an undersized shank, or the nominal cross section of the rod body must be increased whereupon higher rod costs and lower drilling rates must be endured.

Furthermore, it is well recognized that shanks which are formed integrally with the rod body by upset forging are characterized by poor dimensional accuracy, poor finish and poor structure. It is evident that such a shank comprises an unsuitable tool element to coact with carefully sized and machined parts of the rock drill itself, since even slight misalignment of the shank with respect to a cooperating chuck and the hammer striking face produces problems of excessive wear and breakage of costly drill parts. Another bad effect produced by poor matching of the shank and drill parts is that undesirable restrictions are placed on certain metallurgical characteristics of these parts in order that the relatively more expensive drill parts be protected from damage. Thus, it heretofore been impractical to employ a shank having optimum hardness and strength because of the risk of damage to drill parts having the same or lower hardness and strength. In fact, certain advantageous heat treatments, carburization for example, have heretofore been proposed by manufacturers but were abandoned because users of single piece drill rods are loath to risk damage to costly drill parts occasioned by misalignment of forged shanks of poorer condition but of corresponding or higher hardness than cooperating drill parts.

According to the present invention, each of the aforedescribed problems and disadvantages are substantially reduced or eliminated by a rod fabrication method which provides a greatly improved drill rod. Such improvements in method and end result are generally attributable to the provision of a novel composite rod comprising a plurality of joined segmental components rather than the customary one-piece rod. Of the many improvements provided by a composite rod structure, perhaps the most significant is that the shank, body, and bit end of the rod may be designed and fabricated as distinct components thereby permitting individual treatment of the structural requirements and manufacturing problems peculiar to these functionally distinct portions of a drill rod. Thus it is contemplated that the several to-be-joined rod components may comprise different materials having characteristics particularly suited to meet varying specific requirements of strength, hardness, machinability and cost. Furthermore, the relative size and specific shape of the joined segments may be varied substantially as, for example, where it is desirable to maximize the striking surface at the free end of the shank while minimizing the sectional area and the weight of the rod body. Joining parts having such variations in size and shape need be preceded only by mild forging operations necessary to provide matching welding interfaces between the parts.

In the past one-piece rods have been subjected to but a single heat treating operation along the entire length of the rod; consequently, the metallurgical properties of the rod are uniform throughout even though it is recognized that these properties should vary to suit differing strength and hardness requirements of the shank, body and bit end portions of the rod. Attempts to heat treat these rod portions separately and locally have proved to be unsatisfactory because of erratic results and high costs. While the composite rod contemplated by this invention is subjected to a uniform heat treating step subsequent to joining the parts, the metallurgical characteristics created by such uniform heat treatment may be varied in each component part by preselecting starting materials, usually alloy steels, which produce different final metallurgical structures when subjected to the same heating and quenching operations.

Moreover, many of the operations carried out prior to the joining step are performed on discrete rod components thereby facilitating part handling and permitting complex machining operations heretofore believed to be impractical due to the substantial length and weight of one-piece rods. Thus the shank, for example, can be separately machined to its most desirable size, configuration and finish with the utmost accuracy thereby providing a shank which cooperates to the best advantage with precision machined chuck parts of a percussive drill.

Many attempts have been made heretofore to produce rods of the type under discussion; however, all such attempts have failed since no satisfactory method for joining the rod parts has been discovered. Fusion welding, pressure welding, and electric butt and flash welding techniques have been tried without success due to the low reliability and high cost of the joints produced. Another approach to the problem has been to eliminate welded connections in favor of mechanical couplings between structurally discrete shank and rod body elements; however, such connections introduce many well-recognized disadvantages which to a great degree offset the benefits afforded by the utilization of distinct rod components. However, in spite of high cost, inherent energy losses and early part failure, drill rods having threaded or tapered connections currently provide the only commercial approximation of the drill rod contemplated by this invention.

To provide strong and inexpensive connections between rod parts, my improved method includes the step of joining plural rod components in end-to-end relation by heat and pressure, the heat being generated by friction created by relative rotational movement of the parts. This welding method is known as friction welding or spin welding, and it is particularly well adapted to the solution of such problems as misalignment and buckling heretofore encountered in joining elongated rod segments by other known welding procedures.

Still other objects, advantages, and distinctive features of the invention will be understood from the following description and accompanying drawings in which:

FIG. 1 is a partial longitudinal sectional view showing the improved drill rod in assembled relation with the chuck end of a percussive drill;

FIG. 2 is a view of a portion of the body and the bit end of the improved drill rod shown in FIG. 1;

FIG. 3 is a section taken along lines 3—3 of FIG. 1; and

FIG. 4 is a section taken along lines 4—4 of FIG. 1.

In the drawings, the composite drill rod is indicated in its entirety by numeral 10. The rod components include a shank 12, a shaft or body 14 and a bit end 16 which are joined together by a welding process to be described herein.

A percussive tool suitable for impacting the striking face 18 of shank 12 is generally designated by numeral 20 and includes a housing 22, a rotatable chuck driver 24, a chuck 26 and a hammer piston 28 reciprocable within a cylinder 30. A tubular member 32 which axially penetrates the hammer piston and the center bore 34 of the shank 12 functions to communicate hole flushing fluid, such as air or water, from the tool back head, not shown, to the bore 34 and then through rod 10 to the bottom of the hole being drilled. The structure and the mode of operation of tools of the type shown are well understood by those skilled in the percussive drilling art and need not be described herein in detail.

As indicated above, the illustrative rod 10 may comprise two or three component members having distinct structural features; therefore, the descriptive properties of the component members will be considered individually.

The rod body 14 may be made of ordinary steel bar stock in any desired length up to approximately twenty feet. As shown in FIG. 3, the body 14 is hexagonal in cross section; however, any other polygonal configuration or a round section could be substituted if desired. Cross sectional dimensions of this type of drill rod usually vary from about three fourths of an inch up to three inches or more depending on the anticipated loading for a particular application. In most drill rods intended for rock drilling, a bore 36 coaxially penetrates the entire length of the body 14 to provide means for communicating a hole flushing medium to the bit end 16; however, the present method may also be used to advantage in the fabrication of solid rods. Viewing FIGS. 1 and 2, it will be seen that the upper end 38 and the lower end 40 of the body 14 are enlarged somewhat to provide end faces corresponding in area and configuration with abutting end faces of the shank 12 and bit end 16, respectively. These enlargements, which may be quite short in axial dimension, are produced by one-step forging operations which do not entail gross upsetting leading to problematic lapping, folding or scaling; however, it is generally desirable to clear all upset material from the center bore 36. The opposite end faces of the body 14 are squared and flattened by grinding or an equivalent operation to prepare the faces for the welding step to be described. Generally, the body 14 should be characterized by high strength in order to resist failure under shock loading and by substantial hardenability to resist wear yet not be so hard as to prevent straightening following heat treatment. Preferably the body 14 comprises plain carbon steel of a selected carbon content or any of several types of alloyed carbon steel. Since no major machining operations need be performed on the body portion, a high degree of machinability of the metal therein is not required. A specific choice of material for the body portion 14 will be hereinafter presented and discussed in connection with the description of the common heat treating operation to which the joined rod components are subjected.

The bit end 16 will be described herein as a discrete piece which is joined to the lower end 40 of the body 14; however, it will be understood that the invention is not so limited inasmuch as threads corresponding to threads 42 could be machined on the lower rod end 40 or cutting edges, not shown, could be directly formed on or attached to the lower end 40 by known methods. However, it is believed that substantial advantages inure from the illustrated construction wherein a separate bit end 16 is spin welded to the extreme lower end of the body 14. Thus the present invention contemplates that no upsetting will be required to provide an integral enlargement of the rod 10 for purposes of forming a bit thereon or for attaching a bit thereto. It will be appreciated that, by eliminating such an upsetting operation, the several hereinabove enumerated problems attending upsetting a hollow drill rod will be eliminated. Further advantages may be realized by making the bit end 16 from a relatively short blank of solid stock which can be machined to final form prior to attachment to the lower end 40. The reduced size and weight of the proposed bit end 16 will greatly faciiltate and lower the cost of machining operations required to produce the threads 42 or other means for attaching a detachable bit. Similarly the formation of cutting edges or insert receiving slots on the bit end 16 can be accomplished more efficiently than would be the case where such operations are performed on the end of the relatively long body 14. Since the composition of the bit end may be selected independently of the body 14, special free machining steel, such as an 43L20 leaded steel, for example, may be employed in this rod component to facilitate machining thereof while the body 14 is made of relatively less costly material. From the foregoing it will be appreciated that the composition and configuration of the bit end 16 of rod 10 may be selected with special regard to the particular requirements of this portion of the rod apart from the usual restrictions imposed by the characteristics of one piece drill rods.

An important aspect of this invention is the provision of a shank 12 which is fabricated from a blank as a separate element and subsequently joined to the upper end 38 of the body 14. In order to eliminate the hereinabove enumerated problems encountered in upsetting a substantial amount of stock to provide an enlarged shank on the end of a hollow rod, the illustrated shank 12 is preferably fabricated from a relatively short blank of solid stock having a preselectable cross sectional area which can be substantially greater than that of the rod body 14. Where a separate shank is employed, the maximum differential in cross sectional area between the shank 12 and the body 14 is not dictated by the aforementioned practical limitations of hot upset forging methods; instead, the cross sectional area of the blow-receiving end face 18 of the shank 12 can be selected for the most efficient coaction with the striking face of a selected hammer piston 28. Such freedom from limiting size differentials between the hammer piston 28 and the rod body 14 will enable rock drill users to employ larger and more powerful drills to drive drill rods of smaller diameter at greater rates of penetration thereby reducing operating costs by a substantial margin. However, studies of vibrational energy transmission through a rod show that, where the area of the blow-receiving face 18 is more than twice that of the body cross section, the abrupt change in section produces substantial energy losses due to reflection of forces from angular surfaces connecting the rod body and the shank, and such reflected forces set up destructive stresses in the rod itself. Therefore, it is believed that a two to one ratio of shank cross section to rod body cross section comprise a critical upper limit of cross sectional area differential.

If desired, a collar, such as that indicated in the drawings at numeral 43, may be formed on the shank blank by a relatively mild upsetting operation which entails no great amount of stock gathering and, therefore, reduces or eliminates the occurrence of folds or other internal forging defects. The particularly troublesome folds opening to the centerbore of conventionally forged hollow shanks are completely eliminated since this invention contemplates that all forging operations shall be completed before the solid shank blank is provided with a center bore 34.

Another advantage derivable from fabricating the shank 12 from a relatively short blank of stock is that the shank can be machined more accurately and economically as a separate piece than as an integral part of a relatively long and usually somewhat flexible rod. The increased ease of positioning and handling the shank during machining operations and the increased machine speeds permitted make it practical to fabricate a shank in the same manner as the precision made parts of the rock drill itself. The dimensional accuracy, squareness and finish of the shank surfaces can be held close to those of the coacting chuck 26 and the striking face of the hammer piston 28 thereby reducing or eliminating the problems of chipping, spalling and excessive wear caused by misalignment and poor fit of these parts. Thus it is contemplated that the shank 12 will be machined to tolerances of between .005 of an inch and .020 of an inch where the coacting chuck is machined with a .005 of an inch tolerance. This compares with a .035 of an inch minimum tolerance generally encountered in forged shanks. Preferably the blow-receiving surface 18 of shank 12 will exhibit a maximum deviation from square of no more than .010 of an inch where the hammer piston striking face has a maximum deviation from square of .005 of an inch. On the other hand, the blow-receiving surface of forged shanks usually exhibit a maximum deviation from square of as much as .050 of an inch. While the roughness height value of forged shank surfaces is generally as much as 1,000 microinches, the preferred roughness height value of the machined shank 12 is between 15 and 50 microinches. The shank center bore 34 can be drilled with great accuracy to assure good alignment and fit of the flushing tube 32 in the center bore 34. Moreover, better fit and alignment between the chuck 26 and the shank 12 and increased squareness of shank surface 18 will increase the area of the impacting surface between the shank surface 18 and the hammer piston 28 thereby improving the transferal of energy from the hammer piston to the drill bit for faster drilling.

Still another advantage can be realized from a shank which is easily machinable, namely, the shank cross sectional configuration can, for purposes of more efficient design, vary substantially from that of the rod body 14. As shown by a comparison of FIGS. 3 and 4 of the drawings, the rod body is hexagonal while the illustrative shank is round and has diametrically opposed flutes 44 which matingly receive projecting internal splines 45 on the chuck 26. The purpose of these flutes and splines is to align the reciprocating shank more accurately within the chuck and to provide generous lateral bearing surfaces between these parts which prevent excessive heating leading to rapid wear. It will be appreciated that the illustrated shank and chuck design is only one example of the many possibilities for improved design of such parts afforded by a rod fabricating method whereby a separate shank components is adapted for sophisticated machining operations. It will also be appreciated that even conventionally shaped shanks or lugged shanks can be greatly improved in size and finish when fabricated as separate parts.

Another advantage of a rod having a shank which is fabricated as a separate component is that the metallurgical characteristics of the shank 12 can be selected apart from those of the rod body 14 to meet more satisfactorily the high requirements of strength and hardness imposed on the shank by the direct impacting of the hammer piston 28 and the rotary driving forces of the chuck 26. While many of the advantages of this invention can be realized in a composite rod having components of the same material, it is preferable that the shank be more resistant to fatigue failure and plastic deformation since the impact forces acting on the shank are not attenuated as are the forces acting on the rod body 14 and the bit end 16. A preferred material for the shank will be indicated in connection with the description of the heat treating step to which the assembled rod 10 is subjected.

After the shank 12, rod body 14 and bit end 16 have been fabricated in the manner herein described, these components are joined together at the interfaces 46 and 47 to form the illustrated composite rod 10 by a method of friction welding or spin welding whereby welding heat is generated by rotating one component relative to another as they are pressed together axially. As spin welding method generally suitable for the purposes of this invention is described in United States Patent 3,134,169 and an apparatus for carrying out the spin welding operation is shown in United States Patent 3,134,278. While other known welding methods have been tried as a means for joining elements of a percussion drill rod, none has provided a commercially acceptable end result. Conventional gas and electric welding techniques which involve introduction of weld material between the interfaces of the rod components have not produced joints capable of withstanding the severe service to which percussive rods are subjected. Electric butt or flash weldments which involve arcing and melting in the atmosphere produce structurally weak joints having entrapped oxides, dross and the like. In contradistinction to spin welding, pressure welding of the type which entails heating the joint by external means typically produces an undesirably large heat-affected zone which leads to buckling and axial misalignment at the joint and to very large upset sections which waste material and require expensive follow-up operations for the removal of flash and scale. Moreover, application of heat to the weld joint by means of a torch or electric coil is slow, uneven and expensive in comparison to spin welding wherein welding temperatures are achieved between the component interfaces in a matter of seconds. Because of the high axial pressures achieved during spin welding, oxide and dross producing gases cannot enter between the interfaces of the components being joined.

After the rod components have been welded together the external flash is removed by grinding or an equivalent operation and the internal flash in the rod bore is removed.

The composite rod 10 is then subjected to a heat treating operation which will produce those final metallurgical properties in the individual rod components which best meet the needs of each particular component. The type of heat treatment employed must be related to the metallic compositions from which the components have been fabricated so that a uniform heat treatment will produce satisfactory end results for each rod component. Otherwise, two or more heat treating operations would be required to produce selectably different metallurgical characteristics between the shank 12 and the rod body 14, for example. To more clearly indicate the advantages to be derived from a drill rod composed of different and preselectable materials, it may be assumed that the rod 10 is to be subjected to a carburizing heat treatment of the type disclosed in my United States Patent 2,804,412 in order to produce a well known hard case-soft core structure. It is preferred that the carburization and quenching steps produce a case of near maximum hardness of from 58 to 63 Rockwell C on the internal and external surfaces of each of the rod components in order to achieve high strength and wear resistance. The core hardness, which is determined by the chemistry of a selected steel should be somewhat lower than the case hardness in order to exhibit toughness and endurance to repeated impacting. While the case depth and hardness will be uniform for all components, the hardness of the shank core 48 should be greater than that of the body core 49 in order to prevent deformation of the supporting shank core which could lead to cracking and chipping of the more brittle shank case 50. On the other hand, it is desirable that the hardness of the body core 49 be lower than that of the shank core 48 to facilitate straightening and reworking of the body 14. Low carbon alloy steels are well suited for the achievement of these objects by a carburizing heat treatment. For example, where the shank 12 is made from a 3325 steel and the body 14 is made from a 4320 steel having a lower carbon content, the final hardness of the shank core 48 is approximately 50 Rockwell C and the final hardness of the body core 49 is approximately 35 Rockwell C. Other steels can be employed to produce acceptable shank core hardnesses of from 43 to 52 Rockwell C and body core hardness of from 35 to 43 Rockwell C. The hardness of the bit end case 52 will correspond to that of the shank case 50 and the body case 54 since it will have been subjected to carburizing and quenching operations in common with the shank 12 and body 14. The bit end core 56 may conveniently exhibit the same final hardness as the body core 49; however, as noted above, the bit end may contain alloys which provide machining characteristics superior to those of the body 14.

After the rod 10 is carburized and quenched to produce the indicated case and core hardnesses, the rod is straightened, if necessary, by any suitable means.

From the foregoing description it will be appreciated that the present invention provides a drill rod construction wherein components characterized by differences in size, shape, finish, strength, hardenability and machinability are combined to produce a composite rod the use of which provides longer service life, reduces the risk of damage to coacting drill parts, permits great flexibility in shank design, increases the efficiency of energy transmittal from the drill hammer to the bit thereby increasing drilling speed and lowering costs, and removes long standing limitations with respect to the size of drill that can be used to impact a rod of a given nominal size. Furthermore, this improved rod construction is the end result of an inventive fabrication method whereby spin welding is employed to overcome the inadequacies of many other welding methods which have failed as a means for joining components of a percussive drill rod.

It will be understood that the above-described example and the accompanying drawings comprehend only a single preferred embodiment of the invention and that various changes in the construction, materials, proportion and arrangement of the drill rod components and in the details and sequence of the method for making the drill rod may be made without sacrificing the above-enumerated advantages or departing from the scope of the appended claims.

What is claimed is:
1. A percussive drill rod comprising:
    an elongated body;
    a shank having a blow-receiving surface on one end; and
    a friction welded interface joining said body and shank in end-to-end relation.
2. A percussive drill rod comprising:
    an elongated body;
    a shank having a blow-receiving surface on one end;
    a bit end having means for attaching a rock bit thereto; and
    friction welded interfaces respectively connecting said shank and said bit end to opposite ends of said body.
3. A composite drill rod for use with a percussive drill having a piston hammer which has a striking face of a given area, comprising:
    an elongated body;
    a shank;
    a friction welded interface joining said body and shank in end-to-end relation;
    said shank having a blow-receiving surface impacted by said striking face;
    said blow-receiving surface having an area substantially corresponding to the area of said striking face and substantially greater than the nominal cross sectional area of said body.
4. In combination with a percussive rock drill having machined operating parts including a chuck and a piston hammer, a percussive drill rod comprising:
    an elongated body;
    a shank having a blow-receiving surface on one end;
    a friction welded interface joining said body and said shank in end-to-end relation;
    said shank having machined bearing and blow-receiving surfaces coacting with said chuck and said piston hammer; and
    said bearing and blow-receiving surfaces having substantially the same dimensional accuracy and finish as coacting surfaces on said chuck and piston hammer thereby to provide accurate alignment between said shank and said chuck and piston hammer.

5. The invention defined in claim 1 wherein said body and said shank are made of different steels and have a hard case-soft core structure;
  the shank core having a hardness of from 43 to 52 Rockwell C;
  the body core having a hardness of from 35 to 43 Rockwell C; and
  the case on said body and on said shank having the same hardness within a range of from 58 to 63 Rockwell C.

References Cited by the Examiner
UNITED STATES PATENTS

| | | | |
|---|---|---|---|
| 3,022,769 | 2/1962 | Amundsen et al. | 173—104 |
| 3,134,278 | 5/1964 | Hollander et al. | 29—470.3 |
| 3,175,284 | 4/1965 | Cotovsky | 29—470.3 |

FRED C. MATTERN, Jr., *Primary Examiner.*

L. P. KESSLER, *Assistant Examiner.*